United States Patent
Harada et al.

(10) Patent No.: US 12,219,551 B2
(45) Date of Patent: Feb. 4, 2025

(54) TERMINAL FOR IMPROVED SCHEDULING PERFORMANCE

(71) Applicant: NTT DOCOMO, INC., Tokyo (JP)

(72) Inventors: Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 17/442,362

(22) PCT Filed: Mar. 27, 2019

(86) PCT No.: PCT/JP2019/013478
§ 371 (c)(1),
(2) Date: Sep. 23, 2021

(87) PCT Pub. No.: WO2020/194639
PCT Pub. Date: Oct. 1, 2020

(65) Prior Publication Data
US 2022/0191894 A1 Jun. 16, 2022

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0078* (2013.01); *H04W 72/0446* (2013.01);
(Continued)

(58) Field of Classification Search
CPC . H04W 24/10; H04W 72/12; H04W 72/1263; H04W 72/0446; H04W 72/54; H04L 5/0078; H04L 5/0053; G06N 20/00
See application file for complete search history.

(56) References Cited

U.S. PATENT DOCUMENTS

| 10,375,729 | B2 * | 8/2019 | Park | H04W 74/0808 |
| 2012/0149392 | A1 * | 6/2012 | Siomina | H04W 4/029 |
| | | | | 455/456.1 |

(Continued)

FOREIGN PATENT DOCUMENTS

| JP | 2007043369 A | * | 2/2007 |
| JP | 2013-540389 A | | 10/2013 |

(Continued)

OTHER PUBLICATIONS

International Search Report issued in PCT/JP2019/013478 on Jun. 11, 2019 (7 pages).
(Continued)

*Primary Examiner* — Kwang B Yao
*Assistant Examiner* — Bradley D Lytle, Jr.
(74) *Attorney, Agent, or Firm* — Osha Bergman Watanabe & Burton LLP

(57) ABSTRACT

This user terminal is provided with: a control unit for determining information related to the time of a measured value, which satisfies a predetermined requirement, from among a plurality of measured values that have been obtained in accordance with an instruction for measurement pertaining to a radio resource; and a transmission unit for transmitting the information related to the time that has been determined.

6 Claims, 5 Drawing Sheets

(51) Int. Cl.
*H04W 72/0446* (2023.01)
*H04W 72/54* (2023.01)
*G06N 20/00* (2019.01)
*H04W 24/10* (2009.01)

(52) U.S. Cl.
CPC ............ *H04W 72/54* (2023.01); *G06N 20/00* (2019.01); *H04W 24/10* (2013.01)

(56) References Cited

U.S. PATENT DOCUMENTS

| | | | | |
|---|---|---|---|---|
| 2013/0196650 A1* | 8/2013 | Futaki | ................... | H04W 24/10 455/424 |
| 2013/0267230 A1* | 10/2013 | Lin | ....................... | H04W 24/02 455/436 |
| 2015/0181533 A1* | 6/2015 | Chen | .................... | H04W 52/50 455/522 |
| 2018/0084451 A1 | 3/2018 | Fukuta et al. | | |
| 2020/0100297 A1* | 3/2020 | Agiwal | ................ | H04W 52/365 |
| 2021/0084525 A1* | 3/2021 | Takano | ................... | H04W 4/06 |

FOREIGN PATENT DOCUMENTS

| | | |
|---|---|---|
| JP | 2016-012936 A | 1/2016 |
| WO | 2016/185986 A1 | 11/2016 |

OTHER PUBLICATIONS

Written Opinion of the International Searching Authority issued in PCT/JP2019/013478 on Jun. 11, 2019 (8 pages).

3GPP TS 36.300 V15.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)"; Sep. 2018 (358 pages).

\* cited by examiner

TERMINAL FOR IMPROVED SCHEDULING PERFORMANCE

TECHNICAL FIELD

The present disclosure relates to a terminal.

BACKGROUND ART

Long Term Evolution (LTE) has been specified for achieving a higher data rate, lower latency, and the like in a Universal Mobile Telecommunication System (UMTS) network. Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT; NR), and the like (see Non-Patent Literature (hereinafter referred to as "NPL") 1).

CITATION LIST

Non-Patent Literature

NPL 1
3GPP TS 36.300 v15.3.0, "Evolved Universal Terrestrial Radio Access (E-UTRA) and Evolved Universal Terrestrial Radio Access Network (E-UTRAN); Overall description; Stage 2 (Release 15)", September 2018

SUMMARY OF INVENTION

Technical Problem

For example, in NR, artificial intelligence (AI) is assumed to be used in base stations, and thus, there is room for improving the scheduling performance of the base stations.

One object of the present disclosure is to improve scheduling performance of a base station.

Solution to Problem

A terminal according to one aspect of the present disclosure includes: a control section that determines information relating to a time of a measurement value that satisfies a predetermined criterion from among a plurality of measurement values measured according to a measurement instruction relating to a radio resource; and a transmission section that transmits information relating to the time which has been determined.

Advantageous Effects of Invention

According to the present disclosure, it is possible to improve scheduling performance of a base station.

DESCRIPTION OF EMBODIMENTS

Hereinafter, an embodiment of the present disclosure will be described with reference to the accompanying drawings. In the embodiments described below, application of AI technology in a radio communication system such as NR, which is more flexible and has more parameters than LTE, will be described.

An application object of AI technology in the Radio Access Network (RAN) may include at least one of Layer 1 (L1), Layer 2 (L2), and Layer 3 (L3). Applying or utilizing AI technology to RAN may be referred to as, for convenience, "AI for RAN". The concept "AI" may include one or both of machine learning (ML) and deep learning (Deep Learning).

Figure 1:
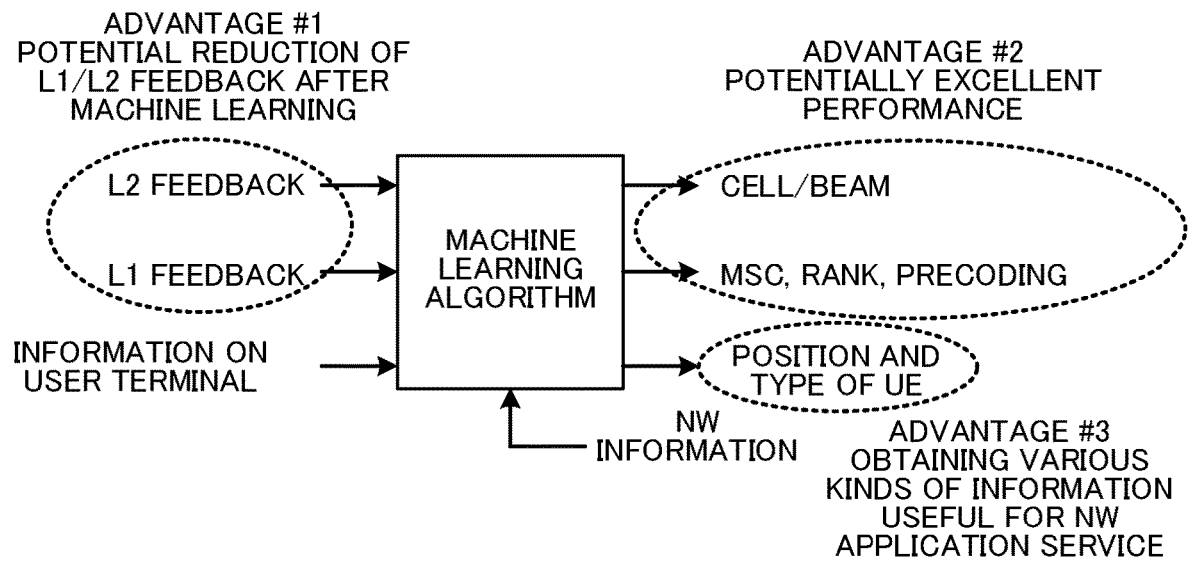
FIG. 1 is a diagram for describing a parameter optimization concept using AI.

FIG. 1 is a diagram for describing a parameter optimization concept using AI. FIG. 1 conceptually illustrates, for example, learning feedback information in one or both of L1 and L2, using an ML-algorithm as an example of AI.

The feedback information is, for example, information to be fed back from a user terminal to a base station, and may be, illustratively, a report to the base station in one or both of processing of a Radio Resource Management (RRM) and a Radio Link Monitoring (RLM).

Learning of the feedback information allows, for example, reducing the number of times of signaling from the base station to the user terminal and also reducing the number of times of feedback from the user terminal to the base station.

In addition, parameters for cell selection and/or beam selection of the user terminal can be optimized through learning of the feedback information, for example. Moreover, parameters relating to rank or precoding in a modulation/coding method (Modulation and Coding Scheme, MCS) or Multiple-Input and Multiple-Output (MIMO) can be optimized through learning of the feedback information, for example. Such optimization of the parameters can be expected to, for example, improve radio communication performance.

An object of learning using the ML algorithm may include one or both of the user terminal information and network (NW) information. The user terminal information may include, for example, at least one of information obtained by the GPS or sensor, capability information that varies depending on a model of the terminal, and information based on use history of the user terminal (e.g., various logs). The NW information may include, for example, at least one of two- or three-dimensional map information, network communication data amount control, communication speed control, and radio power amount control.

The ML algorithm may learn one or both of the user terminal (UE) information and the NW information as described above and provide a learning result (e.g., information on a position and type (mobility type) of UE), for example, to the NW. Note that, the NW may include a radio access network, a core network, and a public network such as the Internet. Moreover, the object of learning using the ML algorithm may include feedback information in L3.

In a radio communication system, it is assumes that the base station schedules the user terminal by AI. For example, it is assumed that AI of the base station collects information to be used for determining scheduling from the user terminal and another base station (e.g., a neighboring base station) and, based on the collected information, schedules the user terminal.

In a case where the base station schedules the user terminal by AI, scheduling performance of the base station can be improved depending on contents of information reported from the user terminal to the base station. For example, according to a scheduling result, the user terminal may report to the base station what happened and when. AI of the base station, for example, optimizes or makes appropriate various parameters for scheduling according to the report from the user terminal. This processing improves the scheduling performance of the base station. Moreover, by improving the scheduling performance of the base station, for example, the efficiency of allocation of radio resources to the user terminal is improved. Furthermore, by improving the scheduling performance, for example, the radio communication performance is improved.

Incidentally, in a case where the user terminal transmits, to the base station having the AI, a measurement report not including information on what happened and when according to the scheduling result, the base station may not be capable of improving the scheduling performance.

For example, the base station possibly cannot know scheduling of which user terminal under the control of another base station (another cell), performed by the other base station causes interference to which user terminal under the control of the base station and thus cannot improve the scheduling performance in some cases. Moreover, for example, the base station cannot know which of interference of another base station, blocking (unexpected CSI fluctuation), or excessive estimation of CSI (incorrect setting of MCS, RI, or PMI) causes data reception failure of the user terminal, and thus cannot improve the scheduling performance in some cases.

Note that, CSI is an abbreviation for Channel State Information. MCS is an abbreviation for Modulation and Coding Scheme. RI is an abbreviation for Rank Indicator. PMI is an abbreviation for Precoding Matrix Indicator. Furthermore, the blocking may include, for example, a case where an antenna of the user terminal is shielded or blocked by a shield or an object.

Figure 2:
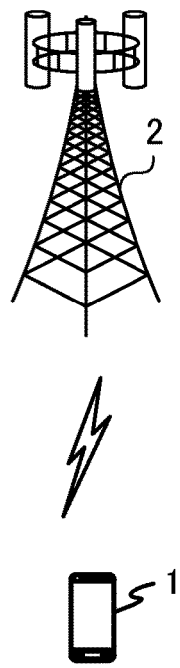
FIG. 2 illustrates an exemplary configuration of a radio communication system according to one embodiment.

FIG. 2 illustrates an exemplary configuration of a radio communication system according to one embodiment of the present disclosure. As illustrated in FIG. 2, the radio communication system includes user terminal 1 and base station 2.

User terminal 1, based on an instruction from base station 2, collects (measures) information to be used for scheduling by base station 2 and transmits the collected information to base station 2. FIG. 2 illustrates one user terminal 1, but there may be a plurality of user terminals 1.

Base station 2 includes AI. Base station 2 instructs user terminal 1 to collect (measure) information to be used for scheduling. The AI of base station 2 autonomously optimizes or makes appropriate the scheduling of user terminal 1 based on information to be used for scheduling transmitted from user terminal 1 and information to be used for scheduling transmitted from another base station (not illustrated).

The term "autonomously" can be replaced with other terms such as "at will," "freely," and "independently," for example.

Figure 3:
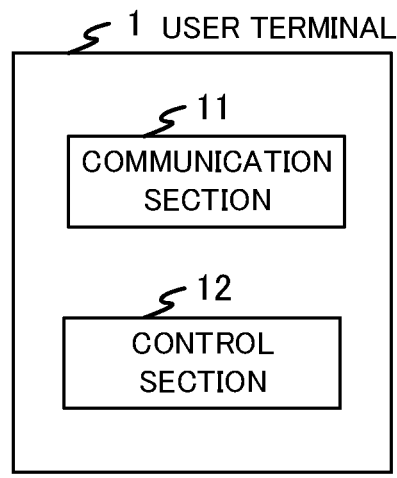
FIG. 3 is a block diagram illustrating an example of a configuration of a user terminal.

FIG. 3 is a block diagram illustrating an example of a configuration of user terminal 1. As illustrated in FIG. 3, user terminal 1 includes communication section 11 and control section 12.

Communication section 11 communicates with base station 2. For example, communication section 11 receives a measurement instruction of information to be used for scheduling from base station 2 (e.g., a measurement instruction relating to a radio resource). In addition, for example, communication section 11 transmits information to be used for scheduling in base station 2, which control section 12 has measured (e.g., information relating to a radio resource), to base station 2.

Control section 12, for example, controls the overall operation of user terminal 1. Control section 12 measures information to be used for scheduling when communication section 11 receives the measurement instruction. Control section 12 transmits the measured information to base station 2 via communication section 11.

Figure 4:
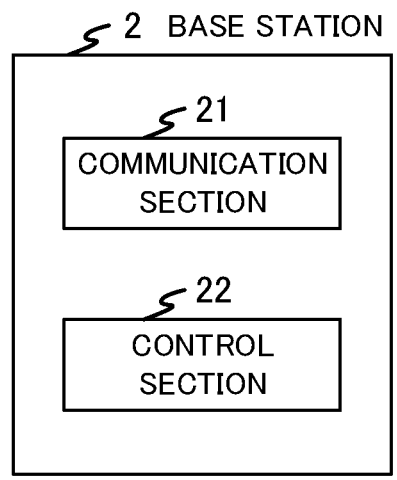
FIG. 4 is a block diagram illustrating an example of a configuration of a base station.

FIG. 4 is a block diagram illustrating an example of a configuration of base station 2. As illustrated in FIG. 4, base station 2 includes communication section 21 and control section 22.

Communication section 21 communicates with user terminal 1. For example, communication section 21 transmits, to user terminal 1, a measurement instruction of information to be used for scheduling. Moreover, for example, communication section 21 receives information to be used for scheduling transmitted from user terminal 1.

Besides, communication section 21 communicates with another base station. For example, communication section 21 receives information to be used for scheduling collected by the other base station.

Control section 22, for example, controls the overall operation of base station 2. Control section 12 includes AI and autonomously determines scheduling of user terminal 1 based on the information to be used for scheduling transmitted from user terminal 1 and/or another base station.

Hereinafter, description will be given of exemplary report operations 1 to 4 of the information to be used for scheduling user terminal 1.

Exemplary Report Operation 1

Upon receiving a measurement instruction from base station 2, control section 12 of user terminal 1 may transmit a measurement report to base station 2, including information relating to a time at which a measurement value that satisfies a certain criterion is observed (measured) and information relating to the measurement value at that time, from among measurement values of respective measurement samples of information to be used for scheduling.

The measurement sample may be, for example, a signal relating to reception quality, such as Reference Signal Received Quality (RSRQ), Signal to Interference plus Noise Ratio (SINR), and Received Signal Strength Indicator (RSSI). The type of measurement sample may be designated by base station 2, and control section 12 of user terminal 1 may collect the measurement sample of the type designated by base station 2. Similarly, a period and range (collecting time) for collecting the measurement samples may be designated by base station 2, and control section 12 of user terminal 1 may collect the measurement sample in the period and range designated by base station 2.

The information relating to the time at which the measurement value is observed may be, for example, a System Frame Number (SFN) and/or a slot number in which the measurements value has been observed.

The information relating to the measurement value may be, for example, an absolute value of a measurement value of a measurement sample or a difference value from a certain reference value. The certain reference value may be, for example, a value after L1/L3 filtering of the measurement value of the measurement sample.

Here, the measurement values such as RSRQ, SINR, and RSSI may fluctuate due to, for example, an effect of signal interference caused by scheduling in other cells (other base stations). Assuming that user terminal 1 reports only an average value of the measurement values to base station 2, it is difficult for base station 2 to recognize the fluctuation of the measurement values. That is, control section 22 of base station 2 cannot recognize, for example, when and how a communication of user terminal 1 is affected by interference due to scheduling in the other cells. Thus, it is difficult to improve the scheduling performance (learning performance of AI) of base station 2.

In contrast, control section 12 of user terminal 1 may transmit a measurement report to base station 2, including therein information relating to a time at which a measurement value that satisfies a certain criterion is observed and information relating to the measurement value at that time, from among measurement values of respective measurement samples of information to be used for scheduling. Thus, control section 22 of base station 2 can recognize when and how a communication of user terminal 1 is affected by interference due to scheduling in the other cells, and accordingly, the scheduling performance can be improved.

In a case where any condition of the following cases 1 to 3 is satisfied, control section 12 of user terminal 1 may report the information on the time of the measurement value and the information on the measurement value to base station 2, including the information, for example, in a measurement report such as a MeasResultNR. The conditions (cases 1 to 3) of the report operation of user terminal 1 may be set by base station 2.

(Case 1)

When a measurement value of a certain measurement sample differs by a predetermined value or more from a value to be reported to base station 2 (e.g., the value after L1/L3 filtering of the measurement value).

(Case 2)

When a measurement value of a certain measurement sample differs by a predetermined value or more from one or both of the maximum value and the minimum value of the measurement values of the other measurement samples used to derive the value to be reported to base station 2 (e.g., the value after L1/L3 filtering of the measurement value)

(Case 3)

When a measurement value of a certain measurement sample is greater and/or less than a predetermined value Incidentally, the "predetermined value" of the cases 1 to 3 may be specified in a specification or standard and may be set by the NW in the Radio Resource Control (RRC) signaling or the like.

In addition, control section 12 of user terminal 1 may derive a "predetermined value," using information notified from the NW. For example, control section 12 of user terminal 1 may report information relating to the time of the measurement sample and information relating to the measurement value to base station 2 in a case where the measurement value of the measurement sample falls below 20% of the maximum value of the measurement values in other measurement samples. In this case, information on a ratio such as "20%" is notified from the NW to user terminal 1, and control section 12 of user terminal 1 derives the value of 20% (predetermined value) of the maximum value among the measurement values in other measured samples, using the "20%" notified from the NW.

Besides, an upper limit and/or lower limit may be set to the "predetermined value". The upper and lower limits may be specified or set respectively, or only one of them may be defined or set.

In addition, control section 12 of user terminal 1 may report to base station 2, as capability information on user terminal 1, whether it is possible to report the information relating to the time at which the measurement value that satisfies a certain criterion is observed and the information relating to the measurement value at that time.

Figure 5:
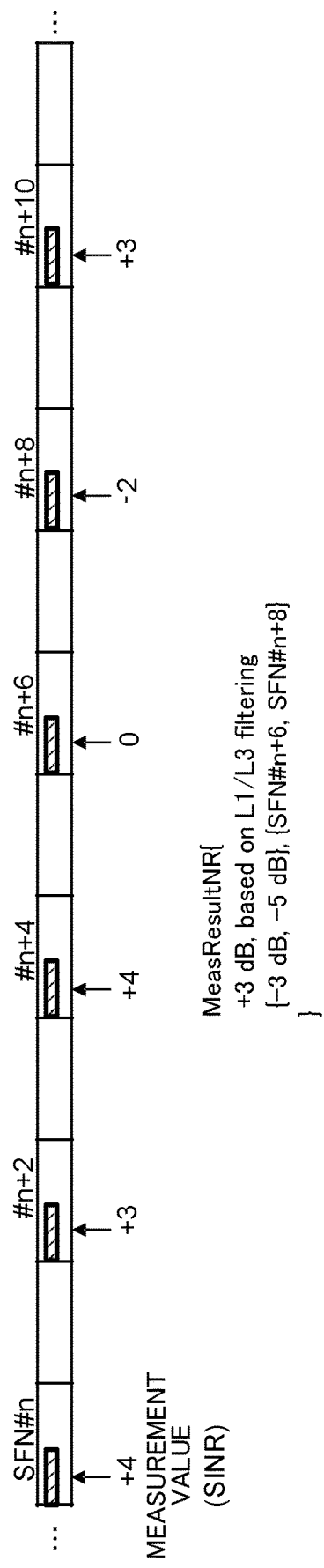
FIG. 5 is a diagram for describing an exemplary report operation 1 of information used for scheduling of the user terminal.

FIG. 5 is a diagram for describing exemplary report operation 1 of information used for scheduling of user terminal 1. FIG. 5 illustrates the frames of SFN #n to SFN #n+10. The hatching illustrated in FIG. 5 indicates an exemplary measurement sample. The measurement sample of FIG. 5 is illustratively SINR.

A measurement cycle of the measurement sample of FIG. 5 (e.g., SMTC Periodicity) is, for example, 20 ms. The value after L1/L3 filtering of the measurement value of the measurement sample in FIG. 5 is "+3 dB." Note that, SMTC is an abbreviation for SSB based RRM Measurement Timing Configuration. SSB is an abbreviation for SS/PBCH Block.

In FIG. 5, in a case where the measurement value of the measurement sample differs by "3 dB" or more than from the value after L1/L3 filtering (reference value), control section 12 of user terminal 1 reports, to base station 2, a difference value of the measurement value different by "3 dB" or more with respect to the reference value and the information relating to the time at which the measurement value different by "3 dB" or more is observed. This exemplary operation of control section 12 of user terminal 1 corresponds to case 1.

In FIG. 5, the reference value (value after L1/L3 filtering) is "+3 dB." In addition, the measurement values of the measurement samples differ by "3 dB" or more from the reference value "+3 dB" in SFN #n+6 and SFN #n+8.

Thus, as illustrated in FIG. 5, control section 12 of user terminal 1 reports the value "+3 dB" after L1/L3 filtering in MeasResultNR to base station 2. Moreover, as illustrated in FIG. 5, control section 12 of user terminal 1 reports, to base station 2, in MeasResultNR, difference values "−3 dB" and "−5 dB," with respect to the reference value "+3 dB," of the measurement value different by "3 dB" or more from the reference value and SFN #n+6 and SFN #n+8 of the measurement values different by "3 dB" or more from the reference value "+3 dB."

Note that, control section 12 of user terminal 1 may report, to base station 2, the measurement values of the measurement samples "0 dB" and "−2 dB," which differ by "3 dB" or more from the reference value "+3 dB." Moreover, control section 12 of user terminal 1 may report, to base station 2, absolute values "0 dB" and "2 dB" of the measurement values of the measurement samples "0 dB" and "−2 dB," which differ by "3 dB" or more from the reference value "+3 dB."

Furthermore, control section 12 of user terminal 1 may report, to base station 2, for example, out of range (OOR) or Not Applicable (NA) in a case where the information (value) relating to the measurement value to be reported to base station 2 exceeds a predetermined value. OOR or NA may be indicated by a particular code point.

As described above, user terminal 1 includes control section 12 that determines information relating to the time of the measurement value that satisfies a predetermined criterion from among a plurality of measurement values measured according to the measurement instruction relating to the radio resource from base station 2. User terminal 1 also includes communication section 11 that transmits the information relating to the determined time to base station 2 in the measurement report. With this configuration, base station 2 can improve the scheduling performance.

Furthermore, communication section 11 of user terminal 1 transmits, to base station 2, information relating to the time of the measurement value that satisfies a predetermined criterion from among a plurality of measurement values measured according to the measurement instruction relating to the radio resource. With this configuration, user terminal 1 can suppress an increase in overhead of the information to be transmitted to base station 2.

Furthermore, when transmitting, to base station 2, the absolute value of the measurement value satisfying a certain criterion or the absolute value of the difference value of the measurement value satisfying a certain criterion from a predetermined value, user terminal 1 can reduce the number of bits of information to be transmitted to base station 2, and thereby can suppress the increase in overhead.

Exemplary Report Operation 2

Upon receiving a measurement instruction from base station 2, control section 12 of user terminal 1 may transmit a measurement report to base station 2, including therein information relating to the measurement value of the measurement resource designated by base station 2. For example, control section 12 of user terminal 1 may transmit a measurement report to base station 2, including therein the measurement value of the measurement resource or a difference value of the measurement value from a certain reference value. The measurement resource may be regarded as a measurement object.

Base station 2 may designate an RRM measurement object as the measurement resource. The measurement resource may be, for example, a sample of signals relating to received quality, such as RSRQ, SINR, and RSSI.

Base station 2 may designate a measurement period (measurement range) of the measurement resource by the SFN that starts the measurement of the measurement resource and the SFN that ends the measurement of the measurement resource. In other words, base station 2 may designate the measurement period of the measurement resource by the information relating to the time at which the measurement of the measurement resource starts and the information relating to the time at which the measurement of the measurement resource ends.

Control section 12 of user terminal 1 may measure the measurement resource in the measurement period designated by base station 2. For example, when "#n" is designated to the SFN that starts the measurement of the measurement resource, and "#n+10" is designated to the SFN that ends the measurement of the measurement resource, control section 12 of user terminal 1 measures a measurement resource in a frame including a measurement resource between SFN #n to SFN #n+10 or in each SFN.

Base station 2 may designate the measurement time at which the measurement resource is measured, using SFN (or by a list of SFNs). In other words, base station 2 may designate, using information relating to the time, the measurement time at which the measurement resources are measured.

Control section 12 of user terminal 1 may measure the measurement resource at the measurement time designated by the base station. For example, when SFN #n, SFN #n+1, and SFN #n+2 are designated, control section 12 of user terminal 1 measures measurement resources in the respective SFN frames of SFN #n, SFN #n+1, and SFN #n+2.

A certain reference value may be specified in a specification or standard and may be notified by the NW in the Radio Resource Control (RRC) signaling or the like. Moreover, control section 12 of user terminal 1 may derive a "certain reference value," using the information notified from the NW.

The certain reference value may be, for example, a value to be reported to base station 2 (e.g., value after L1/L3 filtering of the measurement value).

The certain reference value may be one or both of the maximum value and the minimum value of the measurement values of other measurement resources used to derive the value to be reported to base station 2 (e.g., value after L1/L3 filtering of the measurement value).

Control section 12 of user terminal 1 may report, as NA, a measurement result with respect to a measurement resource for which the measurement value is not measured from among the measurement resources that are commonly recognized with base station 2 (for convenience, may be also referred to as NW) by the range or time (or the range or list of SFNs) of the measurement resources designated from base station 2. For example, control section 12 of user terminal 1 is instructed to measure the measurement resources of the measurement ranges SFN #n to SFN #n+10 from base station 2. When not measuring the measurement resource of SFN #n+1 from among the measurement ranges SFN #n to SFN #n+10 instructed by base station 2, control section 12 of user terminal 1 may report the measurement result of the measurement resource in SFN #n+1 as NA Control section 12 of user terminal 1 may report to base station 2, as capability information on user terminal 1, whether it is possible to report the measurement values of the plurality of measurement resources or a difference value of the measurement value from the reference value.

Figure 6:
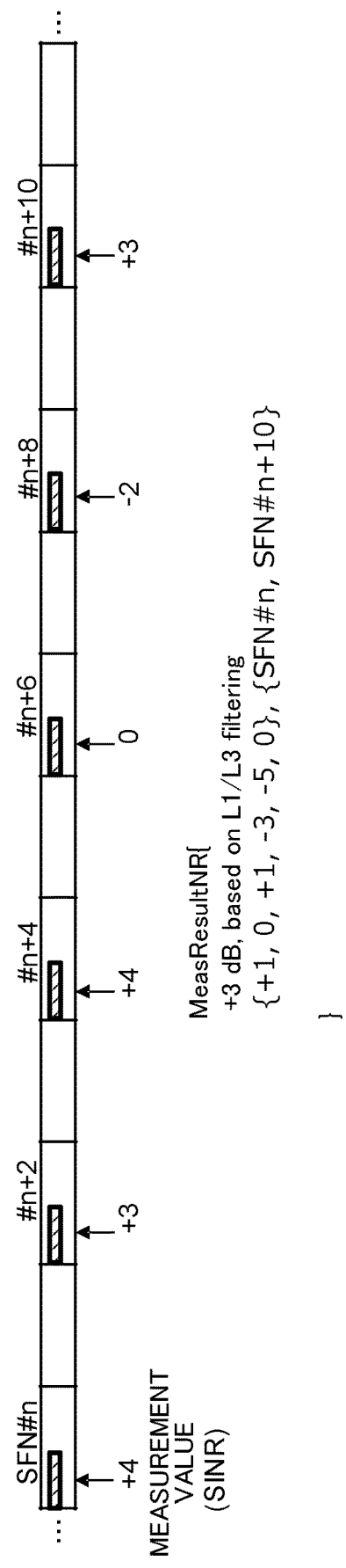
FIG. 6 is a diagram for describing an exemplary report operation 2 of information used for scheduling of the user terminal.

FIG. 6 is a diagram for describing exemplary report operation 2 of information used for scheduling of user terminal 1. FIG. 6 illustrates the frames of SFN #n to SFN #n+10. The hatching illustrated in FIG. 6 illustrates an exemplary measurement resource. In FIG. 6, the measurement resource is illustratively SINR.

A measurement cycle of the measurement resource of FIG. 6 (e.g., SMTC Periodicity) is, for example, 20 ms. The value after L1/L3 filtering of the measurement value of the measured resource in FIG. 6 is "+3 dB."

In FIG. 6, control section 12 of user terminal 1 reports, to base station 2 in the measurement report, the difference value of the measurement value of the measured resource from the reference value. In addition, control section 12 of user terminal 1 reports, to base station 2 in the measurement report, the SFN that starts the measurement of the measurement resource and the SFN that ends measurement of the measurement resource.

In FIG. 6, the reference value (value after L1/L3 filtering) is "+3 dB." Hence, the difference values of the measurement value of the measurement resource from the reference value are "+1 dB," "0 dB," "+1 dB," "−3 dB," "−5 dB," and "0 dB." The SFN that starts the measurement of the measurement resource becomes "#n." The SFN that ends the measurement of the measurement resource becomes "#n+10."

Thus, as illustrated in FIG. 6, control section 12 of user terminal 1 reports the value "+3 dB" after L1/L3 filtering to base station 2, in MeasResultNR. Moreover, as illustrated in FIG. 6, control section 12 of user terminal 1 reports the difference values "+1, 0, +1, −3, −5, 0" of the measurement value of the measured resource from the reference value to base station 2, in MeasResultNR. Furthermore, as illustrated in FIG. 6, control section 12 of user terminal 1 reports the "SFN #n" that starts the measurement of the measurement resource and the "SFN #n+10" that ends the measurement of the measurement resource to base station 2, in MeasResultNR.

Note that, control section 12 of user terminal 1 may report the absolute values "1 dB," "0 dB," "1 dB," "3 dB," "5 dB," and "0 dB" of the difference values from the reference value to base station 2, in MeasResultNR. Moreover, control section 12 of user terminal 1 may report the measurement values "+4 dB," "+3 dB," "+4 dB," "0 dB," "−2 dB," and "+3 dB" of the measured resources to base station 2, in MeasResultNR. Furthermore, control section 12 of user terminal 1 may report the absolute values "4 dB," "3 dB," "4 dB," "0 dB," "2 dB," and "3 dB" of the measurement values of the measured resources to base station 2, in MeasResultNR.

Besides, the information relating to the measurement range or measurement time of the measurement resource is commonly recognized between user terminal 1 and base station 2. Thus, control section 12 of user terminal 1 may not transmit the information relating to the measurement range or measurement time of the measurement resource to base station 2. In FIG. 6, control section 12 of user terminal 1 transmits "+1 dB," "0 dB," "+1 dB," "−3 dB," "−5 dB," and "0 dB" to base station 2, in MeasResultNR, and may not transmit, to base station 2, the information "SFN #n" and "SFN #n+10" indicating the measurement range of the measurement resource.

In addition, control section 12 of user terminal 1 may report the OOR or NA to base station 2 in a case where the information (value) relating to the measurement value to be reported to base station 2 exceeds a predetermined value. Furthermore, control section 12 of user terminal 1 may report, to base station 2, the upper limit value or lower limit value of the measurement value.

As described above, user terminal 1 includes control section 12 that determines the measurement period or measurement time for measuring the information relating to the radio resource according to the measurement instruction relating to the radio resource from base station 2. User terminal 1 also includes communication section 11 that transmits, to base station 2, the measurement value of the information in or at the determined measurement period or measurement time, or the difference value of the measurement value from the predetermined reference value. With this configuration, base station 2 can improve the scheduling performance.

In addition, communication section 11 of user terminal 1 transmits, to base station 2, the measurement value of the information in or at the determined measurement period or measurement time, or the difference value of the measurement value from the predetermined reference value. With this configuration, user terminal 1 can suppress an increase in the overhead of the information to be transmitted to base station 2.

Furthermore, when transmitting, to base station 2, the absolute value of the measurement value or the absolute value of the difference value of the measurement value from a predetermined value, user terminal 1 can reduce the number of bits of information to be transmitted to base station 2, and thereby can suppress the increase in overhead.

Note that, the measurement period may be, for example, a measurement range indicated by the slot number. The measurement time may be indicated by, for example, the slot number.

Exemplary Report Operation 3

Upon receiving a measurement instruction from base station 2, control section 12 of user terminal 1 may transmit one or both of information relating to a measurement sample in which a measurement value satisfying a certain criterion is observed and information relating to the measurement value at that time by including the information in a CSI reporting to base station 2.

The information relating to the measurement sample in which a measurement value satisfying a certain criterion is observed may be regarded as information relating to the time at which the measurement value satisfying a certain criterion is observed. For example, information relating to the measurement sample in which a measurement value satisfying a certain criterion is observed may be, for example, the slot number. The measurement sample may be CSI.

For example, in a case where the measurement value of a certain measurement sample of the CSI deteriorates more than a fixed level compared to the measurement values of other measurement samples, control section 12 of user terminal 1 may transmit information relating to the certain measurement value (i.e., slot number) by including the information in the CSI reporting to base station 2. Control section 12 of user terminal 1 may transmit information relating to the certain measurement value (i.e., slot number) by including the information in any one of L1 reporting, Medium Access Control Control Element (MAC CE), and higher layer signaling to base station 2.

Moreover, for example, in a case where the measurement value of the CSI in a certain CC deteriorates more than a fixed level compared to the measurement value of the CSI in another CC at the same time (the same slot number), control section 12 of user terminal 1 may transmit information relating to the measurement value in the certain CC (i.e., slot number) by including the information in the CSI reporting to base station 2. Control section 12 of user terminal 1 may transmit information relating to the measurement value in the certain CC (i.e., slot number) by including the information in any one of the L1 report, the MAC CE, and the higher layer signaling other than the CSI reporting to base station 2. Incidentally, CC is an abbreviation for Component Carrier.

However, when transmitting information relating to the measurement value of the CSI in the certain CC (i.e., slot number) by including the information in any one of the L1 report, the MAC CE, and the higher layer signaling other than the CSI reporting to base station 2, control section 12 of user terminal 1 may also include information on the CC in which the CSI is deteriorated by more than a fixed level (e.g., serving cell ID). In contrast, since the CSI reporting is executed for each CC (for example, because a CSI reporting part (CSI part) for each serving cell is included), control section 12 of user terminal 1 may not include, in the CSI reporting, the information on the CC in which the CSI is deteriorated by more than a fixed level.

Incidentally, the L1 reporting, the MAC CE, or the higher-layer signaling other than the CSI reporting may have a lower overhead requirement than the CSI reporting. Accordingly, control section 12 of user terminal 1 may transmit information relating to the measurement value of the CSI in the certain CC (i.e., slot number) by including the information in any one of the L1 report, the MAC CE, and the higher layer signaling other than the CSI reporting to base station 2.

The deterioration of the CSI may vary from CC to CC, for example, due to the effect of signal interference by scheduling in other cells. Thus, for example, when the CSIs of CCs are uniformly deteriorated, it can be said that the CSIs are deteriorated by the effect of blocking.

Control section 12 of user terminal 1 may report to base station 2, as capability information on user terminal 1, whether it is possible to report one or both of information relating to a measurement sample that has observed a measurement value satisfying a certain criterion and information relating to the measurement value at that time.

A certain criterion (reference value) and/or a deterioration (value) by more than a fixed level may be specified in a specification or standard and may be notified by the NW in the RRC signaling or the like. Moreover, control section 12 of user terminal 1 may derive a "certain criterion" and/or "deterioration by more than a fixed level," using the information notified from the NW.

A certain criterion and/or deterioration by more than a fixed level may be specified (set) by an absolute value. In addition, the certain criterion and/or the deterioration by more than a fixed level may be specified as a value of deterioration (e.g., a difference value) from an average or maximum value of measurement values of other measurement samples (e.g., CSI). Additionally, the certain criterion and/or the deterioration by more than a fixed level may be specified as a proportion of the deterioration (e.g., %) from the average or maximum value of measurement values of other measurement samples (e.g., CSI).

As described above, user terminal 1 includes control section 12 that determines the information relating to the time of the measurement value satisfying a predetermined criterion from among a plurality of measurement values measured according to the measurement instruction relating to the radio resource from base station 2. User terminal 1 includes communication section 11 that transmits the information relating to the determined time to base station 2 in any of the CSI reporting, or the L1 report, the MAC CE, or the higher layer signaling other than the CSI reporting. With this configuration, base station 2 can improve the scheduling performance.

Furthermore, communication section 11 of user terminal 1 transmits, to base station 2, the information relating to the time of the measurement value satisfying a predetermined criterion from among the plurality of measurement values measured according to the measurement instruction relating to the radio resource, including the information in any of the L1 report, the MAC CE, or the higher layer signaling other than the CSI reporting. With this configuration, user terminal 1 can suppress an increase in the overhead of the information to be transmitted to base station 2

Incidentally, the information relating to the time of observing the measurement value, for example, may be SFN.

Exemplary Report Operation 4

Upon receiving the signal of base station 2, control section 12 of user terminal 1 measures an interference level of the signal of other cells designated by base station 2 (other base stations), and when observing an interference level that satisfies a certain criterion, may report to base station 2 that the interference level that satisfies a certain criterion has been observed. Control section 12 of user terminal 1 may report to base station 2 that the interference level satisfying a certain criterion has been observed, for example, in accordance with HARQ-ACK/NACK or CSI reporting. HARQ is an abbreviation for Hybrid Automatic Repeat Request.

Base station 2 may notify user terminal 1 of information on another cell for observing the interference level, using, for example, Downlink Control Information (DCI), which is the RRC signaling or an example of control information. The information on the other cell for observing the interference level may be indicated by the cell ID or DeModulation Reference Signal (DMRS) sequence information. Control section 12 of user terminal 1 may measure the interference level in another cell indicated by the DMRS the cell ID instructed by base station 2.

In a case where another cell for observing the interference level is instructed by base station 2, control section 12 of user terminal 1 may measure SINR or the interference level (I) of the signal of the other cell upon receiving the signal of the serving cell (base station 2). For example, control section 12 of user terminal 1 may measure SINR of the signal of the other cell when receiving, from the serving cell, a data signal transmitted in PDSCH, a control signal transmitted in PDCCH, or a reference signal transmitted with PDSCH or PDCCH. Incidentally, PDSCH is an abbreviation for Physical Downlink Shared Channel. PDCCH is an abbreviation for Physical Downlink Control Channel.

In a case where the value of SINR or interference level satisfies a certain criterion, control section 12 of user terminal 1 may report that the value of SINR or interference level satisfies the certain criterion with (included in) the HARQ-ACK/NACK or CSI reporting.

Control section 12 of user terminal 1 may report to base station 2, as capability information on user terminal 1, whether it is possible to measure the SINR or the interference level (I) of the signal of the other cell upon receiving the signal of the serving cell (base station 2).

The certain criterion (value) may be specified in a specification or standard and may be notified by the NW in the RRC signaling or the like. Moreover, control section 12 of user terminal 1 may derive a "certain criterion," using the information notified from the NW.

The certain criterion (value) may be specified by an absolute value. In addition, the certain criterion may be specified as a value of deterioration (e.g., a difference value) from an average or maximum value of measurement values of other measurement samples (e.g., CSI). Additionally, the certain criterion may be specified as a proportion of the deterioration (e.g., %) from the average or maximum value of measurement values of other measurement samples.

As described above, user terminal 1 includes control section 12 that determines that the measurement value measured according to the measurement instruction relating to the radio resource from base station 2 satisfies a predetermined criterion. User terminal 1 includes communication section 11 that transmits information indicating that the predetermined criterion is satisfied to base station 2. With this configuration, base station 2 can improve the scheduling performance.

In addition, communication section 11 of user terminal 1 transmits, to base station 2, the information indicating that the predetermined criterion is satisfied. With this configuration, user terminal 1 can suppress an increase in the overhead of the information to be transmitted to base station 2.

The measurement value to be used for determining scheduling may be, for example, RSRQ or RSSI.

The present disclosure has been described above. Incidentally, "satisfying the criterion" can be replaced with "not satisfying the criterion." Furthermore, exemplary report operations 1 to 4 may be combined.

Hardware Configuration and/or the Like

Note that, the block diagrams used to describe the above embodiment illustrate blocks on a function-by-function basis. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," or "transmitter." The methods for implementing the functions are not limited specifically as described above.

Figure 7:
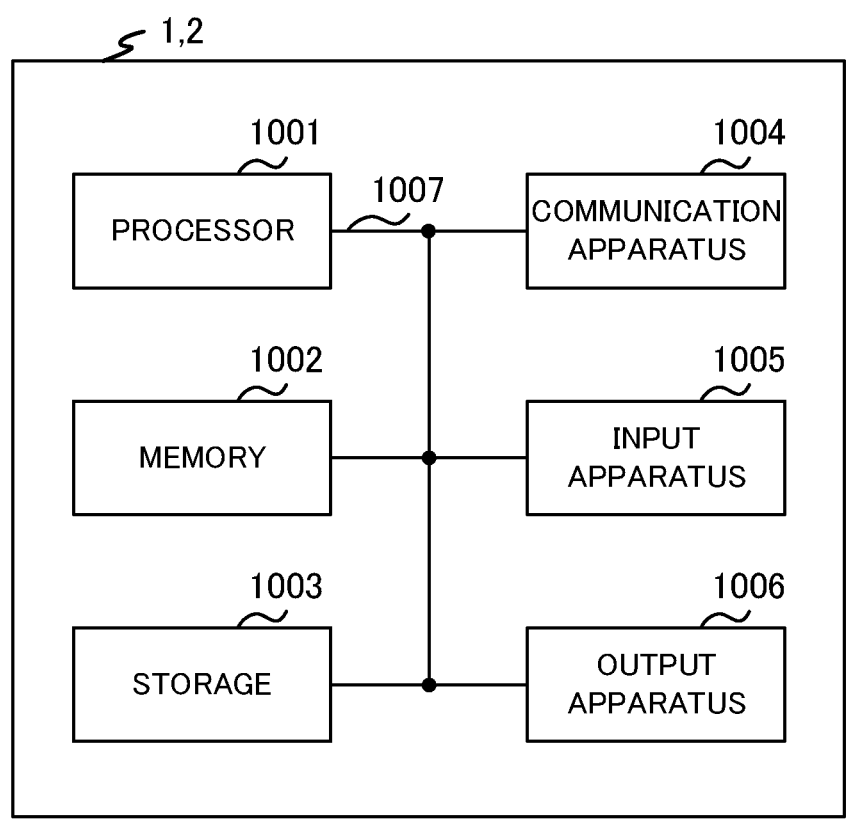
FIG. 7 illustrates an example of a hardware configuration of a user terminal and a base station according to one embodiment of the present disclosure.

For example, the base station, the user equipment, and the like according to an embodiment may function as a computer that executes processing of a radio communication method of the present disclosure. FIG. 7 illustrates an example of a hardware configuration of user terminal 1 and base station 2 according to one embodiment of the present disclosure. User terminal 1 and base station 2 described above may be physically configured as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of user terminal 1 and base station 2 may include one apparatus or a plurality of apparatuses illustrated in the drawings or may not include part of the apparatuses.

The functions of user terminal 1 and base station 2 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a Central Processing Unit (CPU) including an interface with peripheral apparatuses, a control apparatus, an arithmetic apparatus, a register, and the like. For example, control sections 12 and 22 and the like as described above may be implemented by processor 1001.

Processor 1001 reads a program (a program code), a software module, data, and the like from at least one of storage 1003 and communication apparatus 1004 to memory 1002 and executes various types of processing according to the program (the program code), the software module, the data, and the like. As the program, a program for causing the computer to perform at least a part of the operations described in the above embodiment is used. For example, control section 12 of user terminal 1 and control section 22 of base station 2 may be implemented by a control program stored in memory 1002 and operated by processor 1001, and the other functional blocks may also be implemented in the same way. While it has been described that the various types of processing as described above are executed by one processor 1001, the various types of processing may be performed by two or more processors 1001 at the same time or in succession. Processor 1001 may be implemented using one or more chips. Note that, the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be referred to as a register, a cache, a main memory (a main storage apparatus), or the like. Memory 1002 can store a program (a program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (e.g., a compact disc, a digital versatile disc, or a Blu-ray (registered trademark) disc), a smart card, a flash memory (e.g., a card, a stick, or a key drive), a floppy (registered trademark) disk, and a magnetic strip. Storage 1003 may also be referred to as an auxiliary storage apparatus. The storage medium as described above may be, for example, a database, a server, or other appropriate media including at least one of memory 1002 and storage 1003.

Communication apparatus 1004 is hardware (a transmission and reception device) for communication between computers through at least one of wired and wireless networks and is also referred to as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, communication section 11 of user terminal 1 and communication section 21 of base station 2 may be realized by communication apparatus 1004. Communication section 11 may be implemented with a transmission section and a reception section physically or logically separated from each other.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) that makes outputs to the outside. Note that, input apparatus 1005 and output apparatus 1006 may be integrated (for example, a touchscreen).

The apparatuses, such as processor 1001, memory 1002, and the like are connected by bus 1007 for communication of information. Bus 1007 may be configured using a single bus or using buses different between each pair of the apparatuses.

Furthermore, user terminal 1 and base station 2 may include hardware, such as a microprocessor, a Digital Signal Processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information, Signaling)

The notification of information is not limited to the aspects or embodiments described in the present disclosure, and the information may be notified by other methods. For example, the notification of information may be performed by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be referred to as an RRC message and may be, for example, an RRC connection setup message, an RRC connection reconfiguration message, or the like.

(Applied System)

The aspects and embodiments described in the present specification may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a user equipment in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information or the like (see the item of "Information and Signals") can be output from a higher layer (or a lower layer) to a lower layer (or a higher layer). The information, the signals, and the like may be input and output through a plurality of network nodes.

(Handling of Input and Output Information and the Like)

The input and output information and the like may be stored in a specific place (for example, a memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Variations and the Like of Aspects)

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Thus, the description of the present disclosure is intended for exemplary description and does not limit the present disclosure in any sense.

(Software)

Regardless of whether the software is referred to as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or other remote sources by using at least one of a wired technique (e.g., a coaxial cable, an optical fiber cable, a twisted pair, and a Digital Subscriber Line (DSL)) and a wireless technique (e.g., an infrared ray and a microwave), the at least one of the wired technique and the wireless technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or any combination of voltage, current, electromagnetic waves, magnetic fields, magnetic particles, optical fields, and photons.

Note that, the terms described in the present disclosure and the terms necessary to understand the present disclosure may be replaced with terms with the same or similar meanings. For example, at least one of the channel and the symbol may be a signal (signaling). The signal may be a message. The Component Carrier (CC) may be referred to as a carrier frequency, a cell, a frequency carrier, or the like.
("System" and "Network")

The terms "system" and "network" used in the present disclosure can be interchangeably used.
(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulae and the like using the parameters may be different from the ones explicitly disclosed in the present disclosure. Various channels (e.g., PUCCH and PDCCH) and information elements can be identified by any suitable names, and thus, various names assigned to these various channels and information elements are not limitative in any respect.
(Base Station)

The terms "Base Station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be referred to as a macro cell, a small cell, a femtocell, a pico cell, or the like.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor Remote Radio Head (RRH)). The term "cell" or "sector" denotes part or all of the coverage area of at least one of the base station and the base station subsystem that perform the communication service in the coverage.
(Mobile Station)

The terms such as "Mobile Station (MS)," "user terminal," "User Equipment (UE)," and "terminal" may be used interchangeably in the present disclosure.

The mobile station may be referred to as, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.
(Base Station/Mobile Station)

At least one of the base station and the mobile station may be referred to as a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or an unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user equipment with communication between a lot of user equipment (such communication may be referred to as, e.g., device-to-device (D2D), vehicle-to-everything (V2X), or the like). In this case, the user terminal may be configured to have the functions that the base station described above has. The wordings such as "uplink" and "downlink" may be replaced with a corresponding wording for inter-equipment communication (e.g., "side"). For example, an uplink channel, a downlink channel, and the like may be replaced with a side channel.

Similarly, the user equipment in the present disclosure may be replaced with the base station. In this case, the base station may be configured to have the functions that the user equipment described above has.
(Meaning and Interpretation of Terms)

As used in the present disclosure, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Moreover, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.
(Reference Signal)

The reference signal may also be abbreviated as an RS and may also be referred to as a pilot depending on the applied standard.
(Meaning of "Based On")

The description "based on" used in the present disclosure does not mean "based only on," unless otherwise specified. In other words, the description "based on" means both of "based only on" and "based at least on."

(Terms "First" and "Second")

Any reference to elements by using the terms "first," "second," and the like that are used in the present disclosure does not generally limit the quantities of or the order of these elements. The terms can be used as a convenient method of distinguishing between two or more elements in the present disclosure. Thus, reference to first and second elements does not mean that only two elements can be employed or that the first element has to precede the second element somehow.

("Means")

The term "means" in the configuration of each apparatus described above may be replaced with such as "section," "circuit," or "device."

(Open-Ended Format)

In a case where terms "include," "including," and their modifications are used in the present disclosure, these terms are intended to be inclusive like the term "comprising." Furthermore, the term "or" used in the present disclosure is not intended to be an exclusive or.

(Time Units Such as a TTI, Frequency Units Such as an RB, and a Radio Frame Configuration)

The radio frame may be constituted by one frame or a plurality of frames in the time domain. The one frame or each of the plurality of frames may be referred to as a subframe in the time domain.

The subframe may be further constituted by one slot or a plurality of slots in the time domain. The subframe may be a fixed time length (e.g., 1 ms) independent of numerology.

The numerology may be a communication parameter that is applied to at least one of transmission and reception of a certain signal or channel. The numerology may indicate, for example, at least one of SubCarrier Spacing (SCS), a bandwidth, a symbol length, a cyclic prefix length, a Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one symbol or a plurality of symbols in the time domain. Moreover, the mini-slot may be referred to as a subslot. The mini-slot may be constituted by a smaller number of symbols than the slot. A PDSCH (or a PUSCH) which is transmitted in the time unit that is greater than the mini-slot may be referred to as a PDSCH (or a PUSCH) mapping type A. The PDSCH (or the PUSCH) which is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be referred to by other corresponding names.

For example, one subframe, a plurality of contiguous subframes, one slot, or one mini-slot may be referred to as a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit representing the TTI may be referred to as a slot, a mini-slot, or the like instead of a subframe.

Here, the TTI, for example, refers to a minimum time unit for scheduling in radio communication. For example, in an LTE system, the base station performs scheduling for assigning a radio resource (a frequency bandwidth, a transmit power, and the like that can be used in each user equipment) on a TTI-by-TTI basis to each user equipment. Note that, the definition of TTI is not limited to this.

The TTI may be a time unit for transmitting a channel-coded data packet (a transport block), a code block, a codeword, or the like or may be a unit for processing such as scheduling and link adaptation. Note that, when the TTI is assigned, a time section (e.g., the number of symbols) to which the transport block, the code block, the codeword, or the like is actually mapped may be shorter than the TTI.

Note that, in a case where one slot or one mini-slot is referred to as the TTI, one or more TTIs (i.e., one or more slots, or one or more mini-slots) may be a minimum time unit for scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (e.g., the usual TTI, the subframe, or the like) may be replaced with the TTI which has a time length that exceeds 1 ms, and the short TTI (e.g., the shortened TTI or the like) may be replaced with a TTI which has a TTI length that is less than a TTI length of the long TTI and is equal to or longer than 1 ms.

A Resource Block (RB) is a resource assignment unit in the time domain and the frequency domain, and may include one or more contiguous subcarriers in the frequency domain. The number of subcarriers which is included in the RB may be identical regardless of the numerology, and may be 12, for example. The number of subcarriers which is included in the RB may be determined based on the numerology.

Moreover, the RB may include one symbol or a plurality of symbols in the time domain and may have a length of one slot, one mini slot, one subframe, or one TTI. One TTI, one subframe, and the like may be constituted by one resource block or a plurality of resource blocks.

Note that, one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A Bandwidth Part (BWP) (which may be referred to as a partial bandwidth or the like) may represent a subset of contiguous common resource blocks (RBs) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). A UE may be configured with one or more BWPs within one carrier.

At least one of the configured BWPs may be active, and the UE does not have to assume transmission/reception of a predetermined signal or channel outside the active BWP.

Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes which is included in the radio frame, the number of slots per subframe or radio frame, the number of mini-slots which is included within the slot, the numbers of symbols and RBs which are included in the slot or the mini-slot, the number of subcarriers which is included in the RB, the number of symbols within the TTI, the symbol length, the Cyclic Prefix (CP) length, and the like can be changed in various ways.

(Maximum Transmit Power)

The "maximum transmit power" described in the present disclosure may mean a maximum value of the transmit power, the nominal UE maximum transmit power, or the rated UE maximum transmit power.

(Article)

In a case where articles, such as "a," "an," and "the" in English, for example, are added in the present disclosure by translation, nouns following these articles may have the same meaning as used in the plural.

("Different")

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

(Appendix 1)

A terminal, includes:
a control section determining at least one of: (1) information relating to a time of a measurement value that satisfies a predetermined criterion from among a plurality of measurement values measured according to a measurement instruction relating to a radio resource; (2) a measurement period or a measurement time for measuring information relating to a radio resource according to the measurement instruction; and (3) that a measurement value measured according to the measurement instruction satisfies the predetermined criterion; and
a transmission section transmitting a determined result.

(Appendix 2)

The terminal according to appendix 1, wherein the transmission section transmits a measurement value satisfying the predetermined value or a difference value of the measurement value satisfying the predetermined value from the predetermined value.

(Appendix 3)

The terminal according to appendix 1, wherein the measurement period or the measurement time is designated, using a system frame number.

(Appendix 4)

The terminal according to appendix 1, wherein the measurement value satisfying the predetermined value is a value relating to an interference level of a signal of another base station.

(Appendix 5)

A communication method, includes:
determining at least one of: (1) information relating to a time of a measurement value that satisfies a predetermined criterion from among a plurality of measurement values measured according to a measurement instruction relating to a radio resource; (2) a measurement period or a measurement time for measuring information relating to a radio resource according to the measurement instruction; and (3) that a measurement value measured according to the measurement instruction satisfies the predetermined criterion; and
transmitting a determined result.

INDUSTRIAL APPLICABILITY

One aspect of the present disclosure is useful for radio communication systems.

REFERENCE SIGNS LIST

1 User terminal
2 Base station
11, 21 Communication section
12, 22 Control section
1001 Processor
1002 Memory
1003 Storage
1004 Communication apparatus
1005 Input apparatus
1006 Output apparatus

The invention claimed is:

1. A terminal, comprising:
a processor that determines information relating to a time of a measurement value that satisfies a predetermined criterion from among a plurality of measurement values measured according to a measurement instruction relating to a radio resource; and
a transmitter that transmits:
information relating to the time which has been determined, and
terminal capability information,
wherein the terminal capability information indicates whether it is possible to report the plurality of measurement values of the plurality of measurement resources and a difference value of the measurement value from a predetermined value, and
wherein the information relating to the time at which the measurement value is observed is a slot number.

2. The terminal according to claim 1, wherein the transmitter transmits the measurement value or the difference value of the measurement value from the predetermined value.

3. A terminal, comprising:
a processor that determines a measurement period or a measurement time for measuring information relating to a radio resource according to a measurement instruction relating to the radio resource; and
a transmitter that transmits:
a measurement value of the information in the measurement period or at the measurement time which has been determined, or a difference value of the measurement value from a predetermined reference value, and
terminal capability information,
wherein the terminal capability information indicates whether it is possible to report a plurality of measurement values of a plurality of measurement resources and the difference value of the measurement value from the predetermined reference value, and
wherein the measurement period or the measurement time is designated, using a slot number.

4. The terminal according to claim 3, wherein the measurement period or the measurement time is designated, using a system frame number.

5. A terminal, comprising:
a processor that determines that a measurement value measured according to a measurement instruction relating to a radio resource satisfies a predetermined criterion; and
a transmitter that transmits:
information indicating that the predetermined criterion is satisfied, and terminal capability information,
wherein the terminal capability information indicates whether it is possible to report a plurality of measurement values of a plurality of measurement resources and a difference value of the measurement value from a predetermined value, and
wherein the measurement value is observed based on a slot number.

6. The terminal according to claim 5, wherein the measurement value is a value relating to an interference level of a signal of another base station.

* * * * *